US 6,647,427 B1

(12) United States Patent
Watanabe (10) Patent No.: US 6,647,427 B1
(45) Date of Patent: Nov. 11, 2003

(54) HIGH-AVAILABILITY COMPUTER SYSTEM AND METHOD FOR SWITCHING SERVERS HAVING AN IMAGINARY ADDRESS

(75) Inventor: Makoto Watanabe, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/533,814

(22) Filed: Mar. 24, 2000

(30) Foreign Application Priority Data

Mar. 26, 1999 (JP) .......................................... 11-083935

(51) Int. Cl.$^7$ ............................................ G06F 15/173
(52) U.S. Cl. ...................................... 709/239; 709/243
(58) Field of Search ................................. 709/238, 239, 709/242, 247, 200, 201, 243; 713/201

(56) References Cited

U.S. PATENT DOCUMENTS

| 5,774,660 A | * | 6/1998 | Brendel et al. | ............. | 709/201 |
| 6,175,874 B1 | * | 1/2001 | Imai et al. | ................. | 709/238 |
| 6,185,598 B1 | * | 2/2001 | Farber et al. | ................ | 709/200 |
| 6,321,336 B1 | * | 11/2001 | Applegate et al. | .......... | 713/201 |

FOREIGN PATENT DOCUMENTS

JP  10-313404  11/1998

* cited by examiner

Primary Examiner—Le Hien Luu
(74) Attorney, Agent, or Firm—Finnegan, Henderson, Farabow, Garrett & Dunner, L.L.P.

(57) ABSTRACT

Systems and methods are disclosed for switching servers in a network computer system comprising a plurality of servers each of which has a corresponding actual address, and all having an imaginary address in common. According to the disclosed systems and methods, a packet containing a network trailer addressed to an imaginary network address is transmitted to a gateway. The gateway generates a new packet containing the network trailer, addresses the new packet with an actual IP address of one of a plurality of servers according to states of the system, and then transmits the new packet to the server. The server periodically informs the gateway of a state of its own imaginary network address, and the gateway updates its own IP address correspondence table. For remote servers interconnected via a WAN environment, service may be provided to a client by one remote server taking over the service provided by another in the same manner as if the server were adjacent to each other.

22 Claims, 12 Drawing Sheets

HIGH-AVAILABILITY COMPUTER SYSTEM AND METHOD FOR SWITCHING SERVERS HAVING AN IMAGINARY ADDRESS

BACKGROUND OF THE INVENTION

I. Field of the Invention

The present invention relates generally to computer networks. More particularly, this invention relates to a high-availability network computer system.

II. Background and Material Information

Computer systems that include a plurality of nodes (e.g., servers) connected with each other via a network have developed into high-availability computer systems. In those high-availability computer systems, when a failure occurs in a server, another server takes over the failed server to provide the service requested by a client computer ("client"). Thus those systems keep their availability. Those systems may be classified into two types:

(1) systems that include adjacently located servers, and (2) systems that includes servers that are remotely located, for example two servers each located in a different city, and that establish a backup link in case of disasters such as an earthquake or fire.

In the first type of systems, each server in a system is usually connected to the same local area network (LAN), and each is given an internet protocol address (IP address) having the same data in its network address section. An IP address includes a network address section and a host address section. In the second type of systems, each server in a system is usually connected to different LANs which are in turn connected to a wide area network (WAN) such as a communication line for public use. Also, each server is given an IP address having different data in its network section.

A high-availability computer system is highly desirable so that service can be continually provided to clients even in the event that one server replaces another to provide the same service to a client. That is, in the systems that include adjacently located servers either a mechanism which switches IP addresses, or an application program stored in a client computer which switches a server from a set of servers in order to establish a connection with a client is needed to provide continuous service to clients. In the system that includes servers that are remotely located, the application program is needed.

SUMMARY OF THE INVENTION

In view of the foregoing, the present invention solves the problems in the art related to the modification of application programs in a client's computer by providing systems and methods for switching servers in a network computer system.

In accordance with an aspect of the present invention, as embodied and broadly described, the present invention is directed to a method for switching servers in a network computer system. The system includes a client, a plurality of servers, and a gateway. Each server has both at least one actual address and a common imaginary address. The method includes the following steps: transmitting a first packet addressed to the imaginary address, the packet including a network trailer; extracting the network trailer from the first packet; generating a second packet that includes the network trailer; assigning one of the actual addresses to the second packet; transmitting the second packet to a server having the actual address; and extracting the network trailer from the second packet.

Also in accordance with another aspect of the present invention, there is provided a network computer system. The network computer system includes a plurality of servers, a client, and a gateway. Each server has at least one corresponding actual addresses and an imaginary address in common. The client transmits a first packet addressed to an imaginary address which contains a network trailer. The gateway extracts the network trailer from the first packet, generates a second packet which includes the network trailer, assigns one of the actual addresses to the second packet, and transmits the second packet to a server having the actual address. The server extracts the network trailer from the second packet.

BRIEF DESCRIPTION OF THE DRAWINGS

The accompanying drawings, which are incorporated in and constitute a part of this specification, illustrate various embodiments and/or features of the invention and together with the description, serve to explain the principles of the invention. In the drawings.

DETAILED DESCRIPTION

The various aspects and features of the present invention will be hereinafter described with reference to the accompanying drawings.

Systems and methods consistent with the present invention provide a high-availability service to a client. For purposes of the following description, the systems and methods consistent with the present invention are described with respect to the open systems interconnection multi-layer model and Internet protocol. However, the description should be understood to apply in general to any multi-layer model and any protocol used as part of the multi-layer model.

Figure 1:
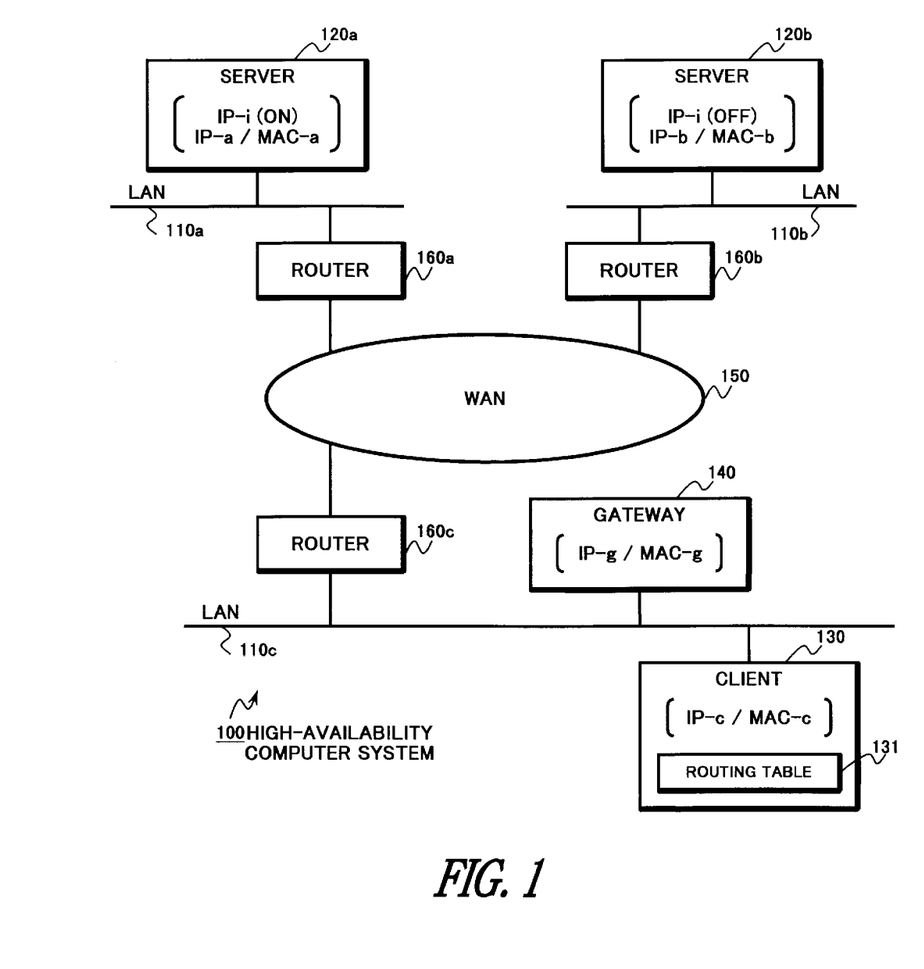
FIG. 1 is an exemplary block diagram illustrating a high-availability computer system according to one embodiment of the present invention.

FIG. 1 is an exemplary block diagram illustrating a configuration of a high-availability computer system 100 according to one embodiment of the present invention.

The system 100 in FIG. 1 includes LANs 110a–c; servers 120a–b; routers 160a–c; a WAN 150; a gateway 140; and a client 130. LANs 110a and 110b are respectively connected to servers 120a and 120b and LAN 110c is connected to client 130. Client 130 is provided with service by servers 120a and 120b. Client 130 includes a routing table 131. It is used for transmitting a packet to servers 120a and 120b. LAN 110c is connected to gateway 140 which executes a protocol conversion. Every LAN 110a, 110b, and 110c is connected to WAN 150 respectively via routers 160a, 160b, and 160c. In this embodiment, a transmission control protocol/internet protocol (TCP/IP) is used for transmission of data over the high-availability computer system 100.

Figure 2:
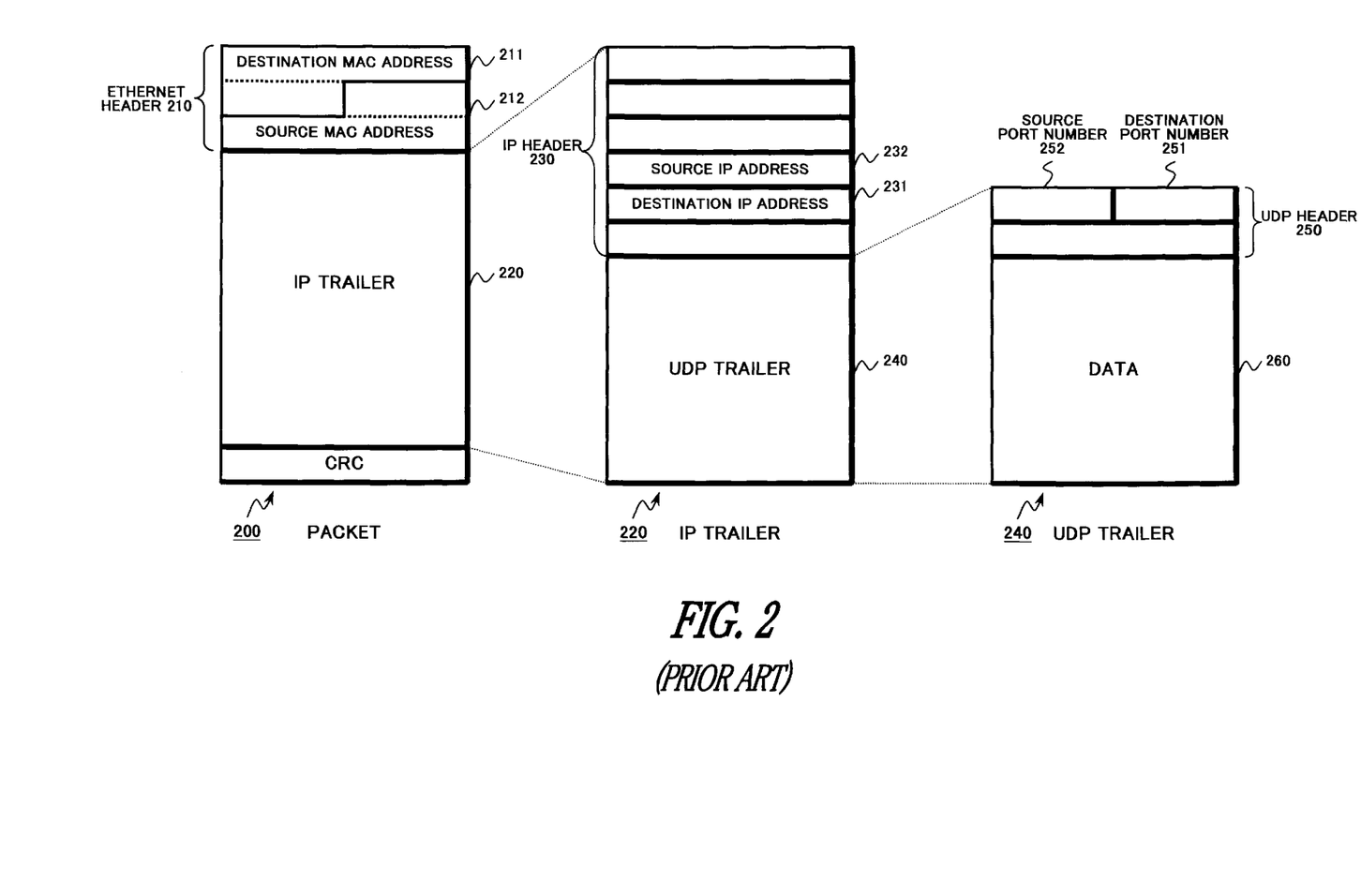
FIG. 2 illustrates an exemplary format of a conventional packet.

FIG. 2 illustrates an exemplary format of a packet 20, i.e., Ethernet trailer.

Packet 200 includes an Ethernet header 210 containing both a destination media access control (MAC) address 211 and a source MAC address 212, and an IP trailer 220 which is a data section of the packet 200. IP trailer 220 includes an IP header 230 containing both a destination IP address 231 and source IP address 232, and a user diagram protocol (UDP) trailer 240 which is a data section of IP trailer 220. UDP trailer 240 includes an UDP header 250 containing both destination port number 251 and a source port number 252, and also includes a data section 260.

Servers 120a and 120b respectively have uniquely assigned IP addresses "IP-a" and "IP-b" ("actual addresses"), and have a common IP address "IP-i" ("imaginary IP address")used by one server to take over in case of failure.

Figure 3:
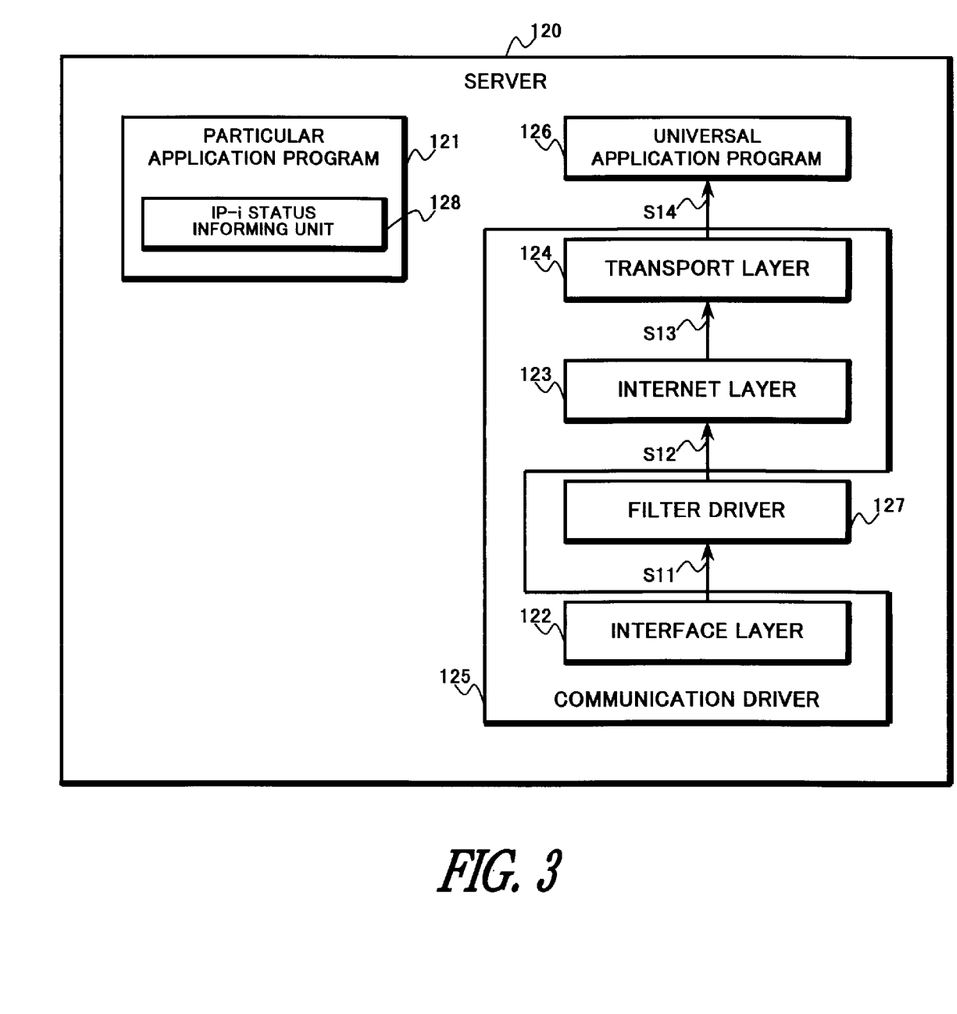
FIG. 3 is an exemplary block diagram depicting the configuration of a server according to one embodiment of the present invention.

FIG. 3 is an exemplary block diagram depicting the configuration of server 120.

Server 120 includes a particular application program 121, a communication driver 125, a universal application program 126, and a filter driver 127. Communication driver 125 controls three layers in server 120, namely, an interface layer 122, an internet layer 123, and a transport layer 124.

Particular application program 121 has an IP-i status informing unit 128 which informs gateway 140 of a status of its own IP-i, namely, "ON" (valid) or "OFF" (invalid). An IP-i is set with "ON" alternatively in server 120a or 120b. When server 120a is ON and server 120b is OFF, Therefore, client 130 recognizes servers 120a and 120b as single server having the IP-i. That is, client 130 does not distinguish between valid server 120 and invalid one.

Filter driver 127 has a function corresponding to both interface layer 122 and internet layer 123, located between interface layer 122 and internet layer 123. Filter driver 127 checks destination IP address 231 of IP trailer 220 transmitted from interface layer 122. If the destination IP address is different from its own actual IP address, filter driver 127 disposes IP trailer 220. Meanwhile, if the destination IP address is the same as its own actual IP address, filter driver 127 extracts UDP trailer 240 from IP trailer 220, and checks destination port number 251. Filter driver 127 may transmit IP trailer 220 to internet layer 123 based on destination port number 251.

Client 130 transmits every packet 200 addressed to an IP-i to gateway 140. A MAC address "MAC-g" uniquely assigned to gateway 140 may be set in routing table 131 of client 130, as a physical address corresponding to the IP-i.

Figure 4:
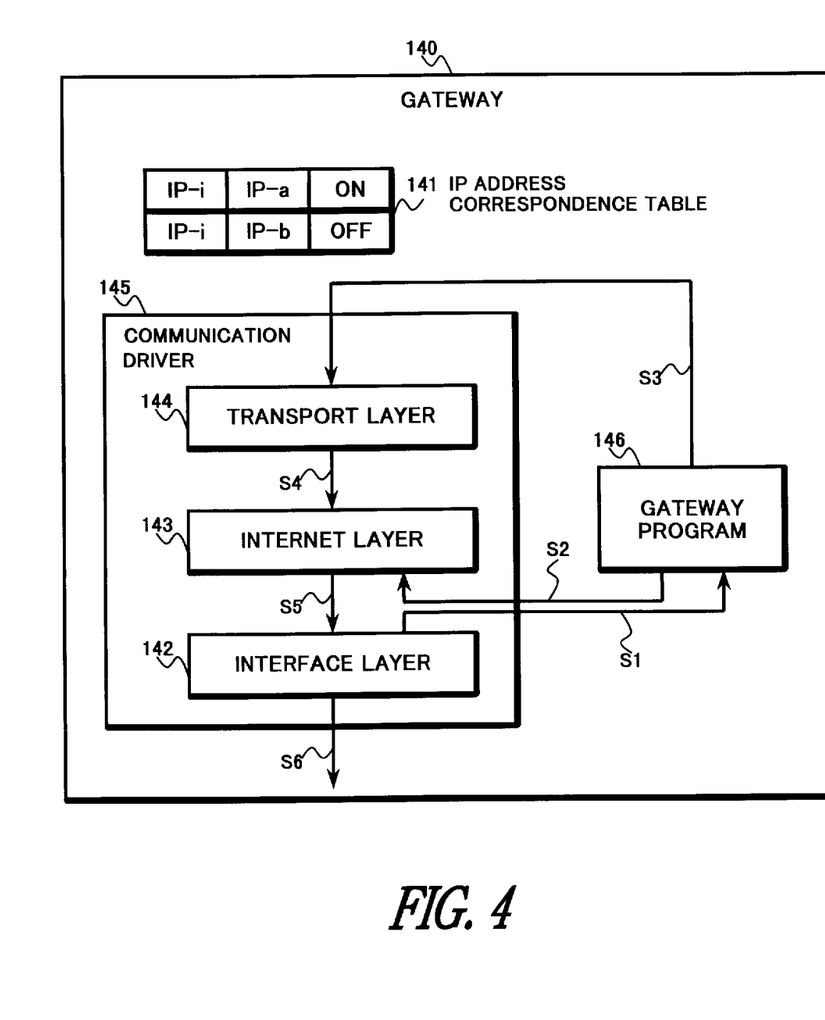
FIG. 4 is an exemplary block diagram depicting the configuration of a gateway according to one embodiment of the present invention.

FIG. 4 is an exemplary block diagram depicting the configuration of gateway 140.

Gateway 140 includes an IP address correspondence table 141, a communication driver 145, and a gateway program 146. Communication driver 145 controls three layers in gateway 140, namely, an interface layer 142, an internet layer 143, and a transport layer 144. FIG. 4 does not show the network interface to LAN 110c.

IP address correspondence table 141 records three kinds of information that is mutually related information as a set. The set includes an IP-i, an actual IP address of server 120 assigned with the IP-I (i.e., an IP-a and an IP-b ), and flag information indicating the IP-i status of the server. For example, when server 102a transmits a notice that its own IP-i is currently "ON" to the gateway 140 (an "ON notice"), the flag information corresponding to the IP-a is set with "ON" in gateway 140, while the flag information corresponding to the IP-b is set with "OFF." For example, only if both information flags are set with "OFF", the flag information corresponding to the IP-a may be set with "ON" when gateway 140 receives an ON notice by server 120a. In this case, server 120a may transmit the ON notice after inquiring gateway 140 of a status recorded in IP address correspondence table 141.

When interface layer 142 receives packet 200, communication driver 145 transmits IP trailer 220 of packet 200 to gateway program 146, and, not to internet layer 143.

When receiving IP trailer 220 from interface layer 142, gateway program 146 checks a destination IP address 231 in IP trailer 220. If destination IP address 231 is not an IP-i, gateway program forwards the IP trailer 220 to internet layer 143. If the destination IP address is an IP-i, gateway program forwards the IP trailer 220 to transport layer 144.

When IP trailer 220 is transmitted from gateway program 146 to internet layer 143, communication driver 145 forwards IP trailer 220 to interface layer 142. After gateway program 146 forwards IP trailer 220 to transport layer 144, an UDP trailer 240 is transmitted from transport layer 144 to internet layer 143 and communication driver 145 generates a new IP trailer 220, and transmits it to interface layer 142. IP trailer 220 contains UDP trailer 240 as its own data section, and an actual IP address which is recorded corresponding to the valid IP-i in IP address correspondence table 141 as its own destination IP address section.

FIGS. 5(a)–5(e) illustrates an operation of high-availability computer system 100 when a client 130 transmits a packet 200d, addressed to an IP-i, while the IP-i is valid for server 120a.

Figure 5A:
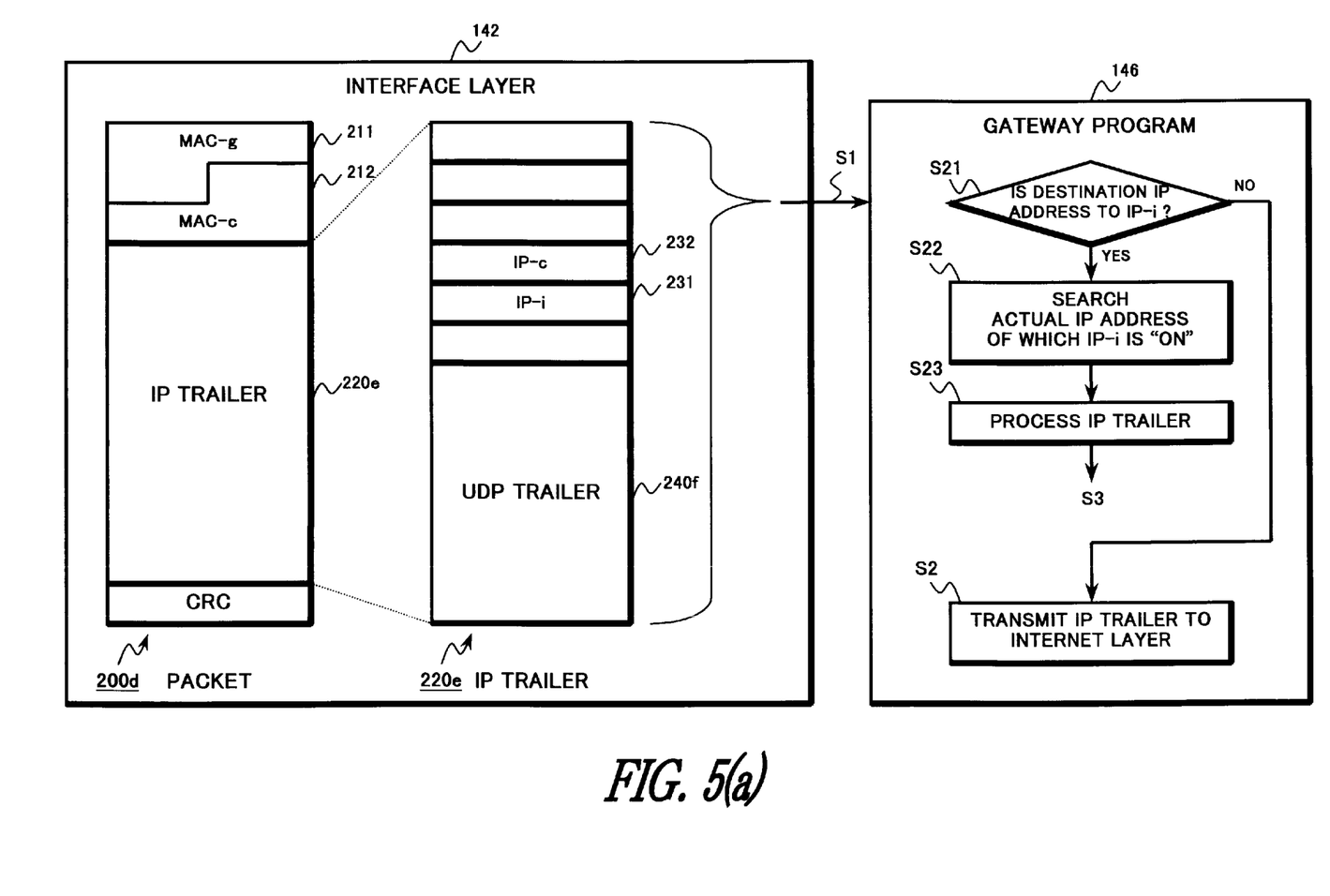
FIGS. 5(a)–5(e) illustrates the operation of the high-availability computer system according to one embodiment of the present invention.

Referring to FIG. 5(a), client 130 generates a packet 200d addressed to the IP-i, and transmits the packet 200d via gateway 140 according to a routing table 131. Destination MAC address 211 and source MAC address 212 contained in an Ethernet header section in packet 200d are respectively set with a MAC-g (i.e., MAC address corresponding to gateway 140) and a MAC-c (i.e., MAC address corresponding to client 130). Destination IP address 231 and source IP address 232 contained in IP trailer 220e of packet 200d are respectively set with an IP-i and an IP-c (i.e., IP corresponding to client 130).

Client 130 transmits packet 200d to LAN 110c. The packet 200d is received by gateway 140, based on the MAC-g contained in its destination MAC address 211. When received by gateway 140, IP trailer 220e is extracted from packet 200d at interface layer 142 by communication driver 145. IP trailer 220e is transmitted to gateway program 146, not to internet layer 143 (step S1 in FIGS. 4 and 5(a)).

Gateway program 146 processes IP trailer 220e as follows. Step S21 includes checking whether destination IP address contained in an IP header section of IP trailer 220e is addressed to an IP-i. If the destination IP address is not an IP-i, IP trailer 220e is forwarded to internet layer 143, and is processed in interface layer 133 in a conventional manner (step S2 in FIGS. 4 and 5(a)). If destination IP-address 232 is an IP-i, an actual IP address which is recorded corresponding to the valid IP-i in IP address correspondence table 141 (i.e., IP-a), is obtained as a new destination IP address 231 (step S22 in FIG. 5(a)). IP trailer 220e is then processed in interface layer 143 in a conventional manner (step S23 in FIG. 5(a)). Subsequently, IP trailer 220e is transmitted to transport layer 144, with the IP-a and the IP-g respectively as the new destination IP address and a source IP address (step S3 in FIGS. 4 and 5(b)).

Figure 5B:
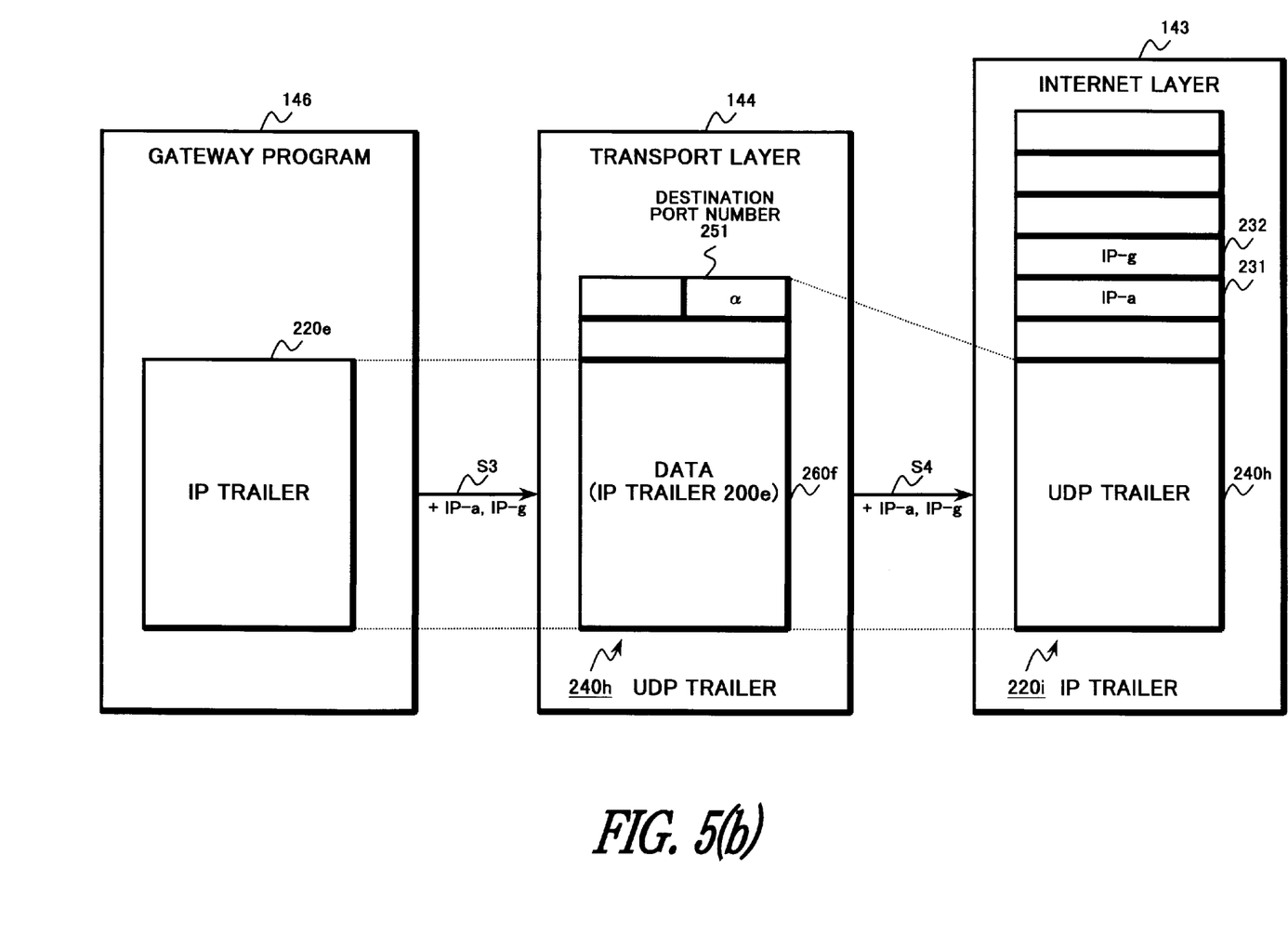

In transport layer 144, IP trailer 220e is inserted in a data section of UDP trailer 240h, as shown in FIG. 5(b). A port number "α", which is used for a switching of the packet processing further described below, is set in destination port number 251 included an UDP header section of UDP trailer 240h. UDP trailer 240h is transmitted to internet layer 143 from transport layer 144, with the IP-a and the IP-g (step S4 in FIGS. 4 and 5(b)).

When internet layer 143 receives UDP trailer 240h, the IP-a, and the IP-g, a new IP trailer 220i having its data section set with UDP trailer 240h is generated. The IP-a and the IP-g are contained in an IP header section of IP trailer 220i respectively as a destination IP address and a source IP address.

Figure 5C:
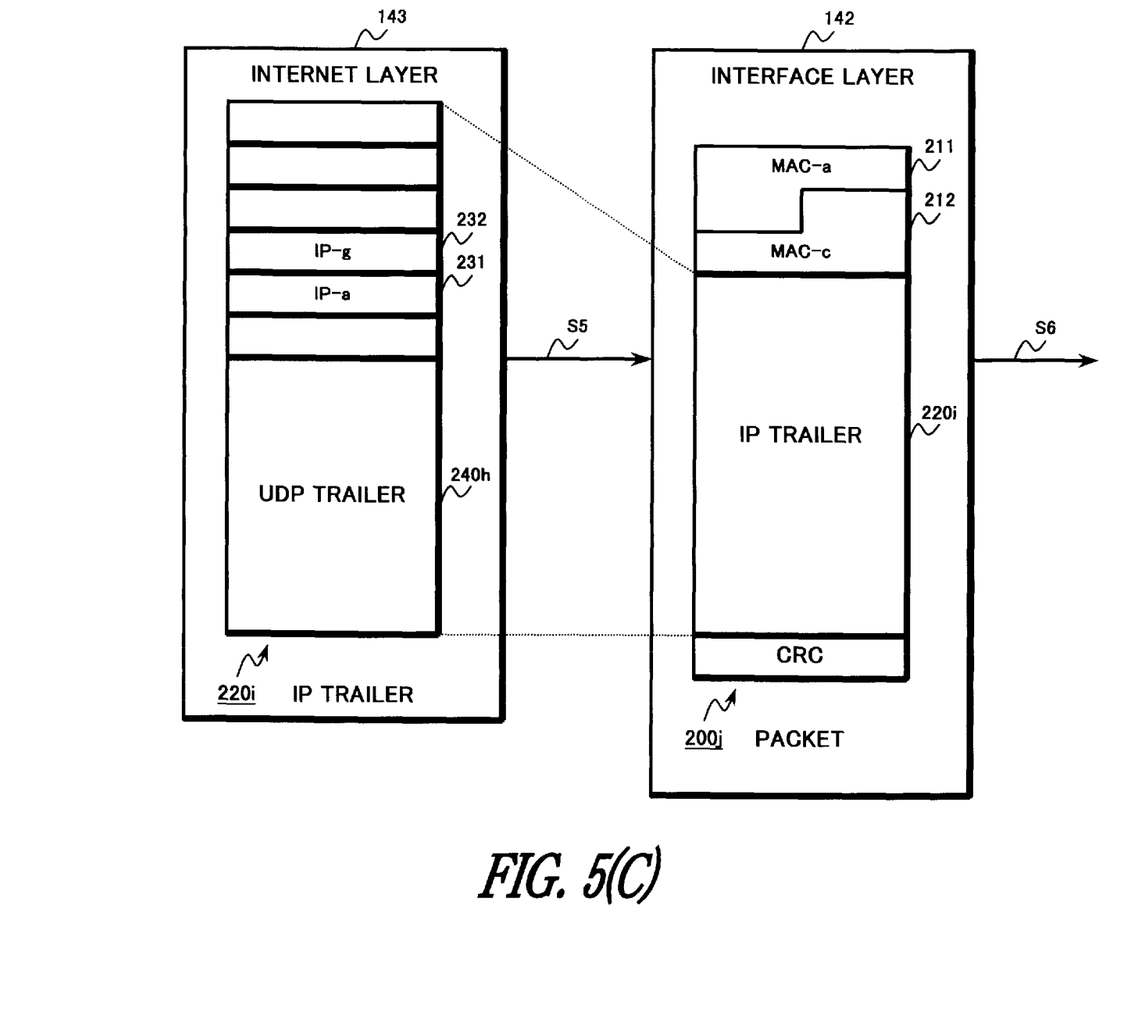

IP trailer 220i is transmitted from internet layer 143 to interface layer 142 (step S5 in FIGS. 4 and 5(c)). When interface layer 132 receives, when receiving IP trailer 220i, a new packet 200j having its Ethernet data section set with IP trailer 220i is generated as shown in FIG. 5(c). A MAC address of server 120a which is addressed in the destination IP address on IP trailer 220i, namely, MAC-a, is set in an Ethernet header section of packet 220j as destination MAC address 211. A MAC address of client 130, namely, MAC-c is set in the Ethernet header section as source MAC address 212.

Packet 200j is transmitted from interface layer 142 to LAN 110c via a network interface (not shown) (step S6 in FIGS. 4 and 5(c)). Packet 200j is transmitted to LAN 110a via router 160c, WAN 150, and router 160a, and received by server 120a, based on information that the MAC-a includes destination MAC address 211 of packet 200j.

Figure 5D:
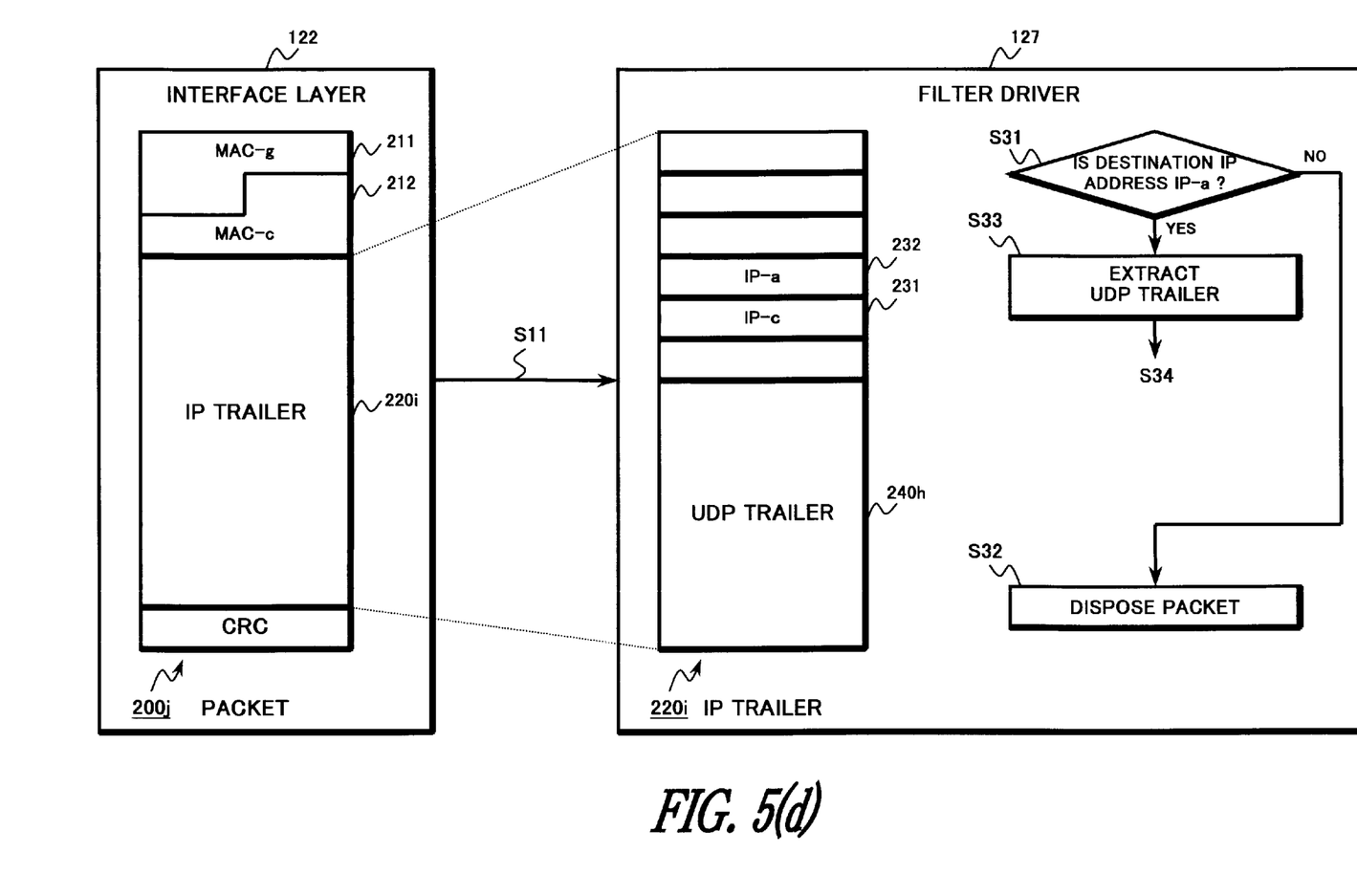

When received by server 120a, IP trailer 240h is extracted from packet 220j at interface layer 122 by communication driver 125 as shown in FIG. 5(d). IP trailer 220i, which is generated by gateway 130, includes IP trailer 220e transmitted from client 130. IP trailer 220i is transmitted to filter driver 127 from interface layer 122 (step S11 in FIGS. 3 and 5(d)).

The filter driver 127 in server 120 may perform packet processing as follows. A destination IP address contained in an IP header section of IP trailer 220i is checked for an actual IP address (step S31 in FIG. 5(d)). If the destination IP address is different from the IP-a, packet 200j is disposed (step S32). Meanwhile, if the destination IP address is the IP-a, UDP trailer 240h is extracted from IP trailer 220i (step S33 in FIG. 5(d)).

Thus a processing corresponding to internet layer 123 is firstly performed in filter driver 127.

Subsequently, filter driver 127 performs a processing corresponding to transport layer 124. Destination port number 251 contained in 240h is checked for the number α (step S34 in FIG. 5(e)). If destination port number 251 is different from α, IP trailer 220j is forwarded to internet layer 123, in the same manner as when receiving packet 200 addressed to an IP-i in interface layer (step S12 in FIGS. 3 and 5(e)). Meanwhile, if destination port number 251 contains α, the contents of UDP data section 260f are extracted from UDP trailer 240h (step S35 in FIG. 5(e)). That is, destination port number 251 indicates that the UDP trailer 240h is originally addressed to the IP-i.

UDP data section 260f corresponds to IP trailer 220e, which is originally contained in packet 200d. That is, IP trailer 220e is restored in filter driver 127. Filter driver 127 transmits restored IP trailer 220e to internet layer 123 (step S12 in FIGS. 3 and 5(e)).

UDP trailer 240f is extracted from IP trailer 220e at internet layer. UDP trailer 240f is transmitted to transport layer 124, in the same way as when IP trailer 200 is received from interface layer 122 (step S13 in FIG. 3).

When UDP trailer 240f is received by transport layer 124, data set in the UDP data section of UDP trailer 240f is extracted. The extracted data is transmitted to universal application program 126 designated by destination port number 251 of UDP header 250 (step S14 in FIG. 3). Thus, a takeover of IP addresses is performed in a WAN environment.

Figure 5E:
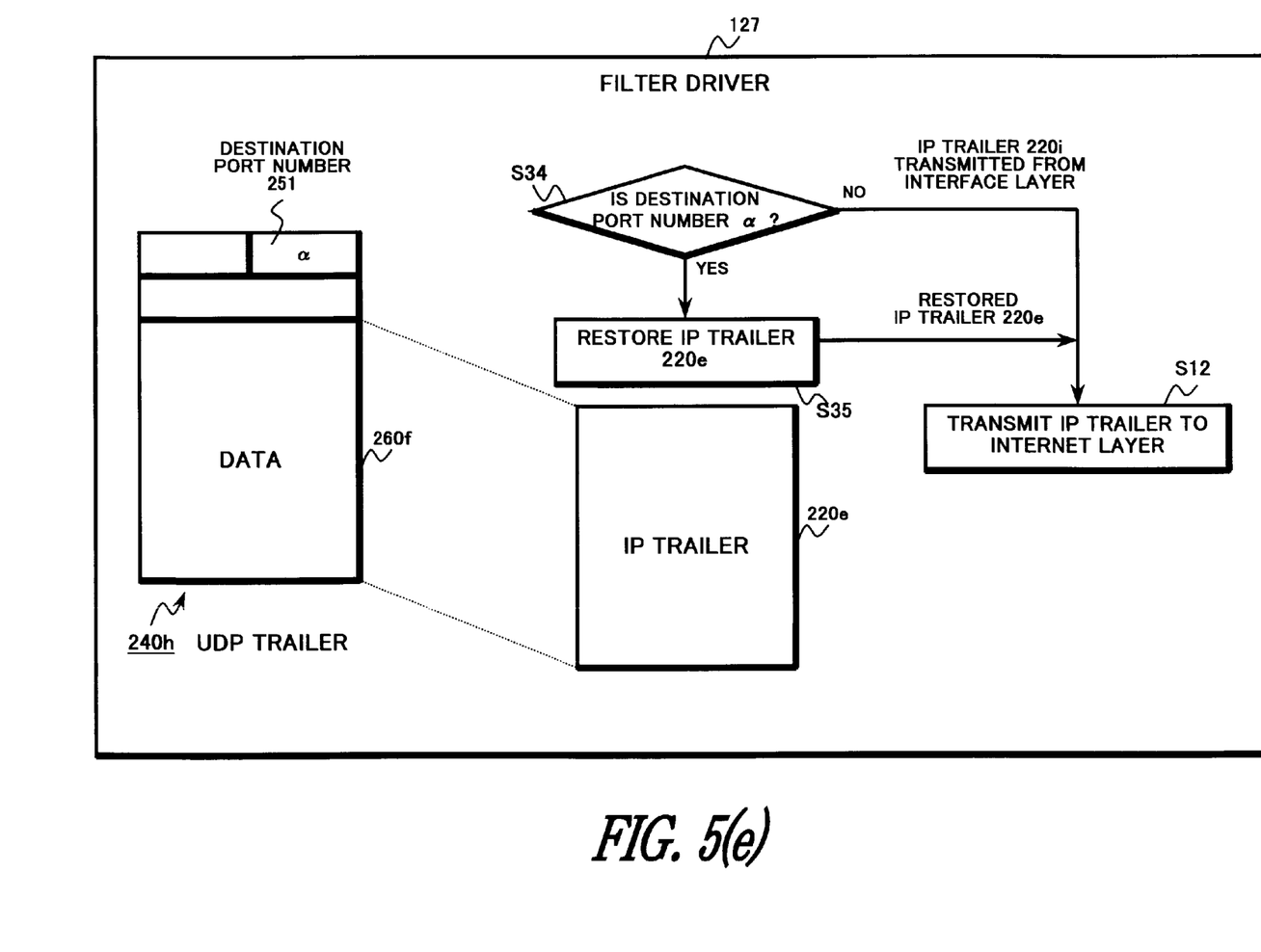

When receiving IP trailer 220e, due to a request from client 130, server 120a transmits a reply packet to client 130. This reply from server 120a to client 130 is performed as usual. Either the IP-a or IP-i may be set as a source IP address. However, the IP-a may not be used if a client has a function which checks an identity between an IP-i and the source IP address contained in the reply packet received from server 120a.

Figure 6:
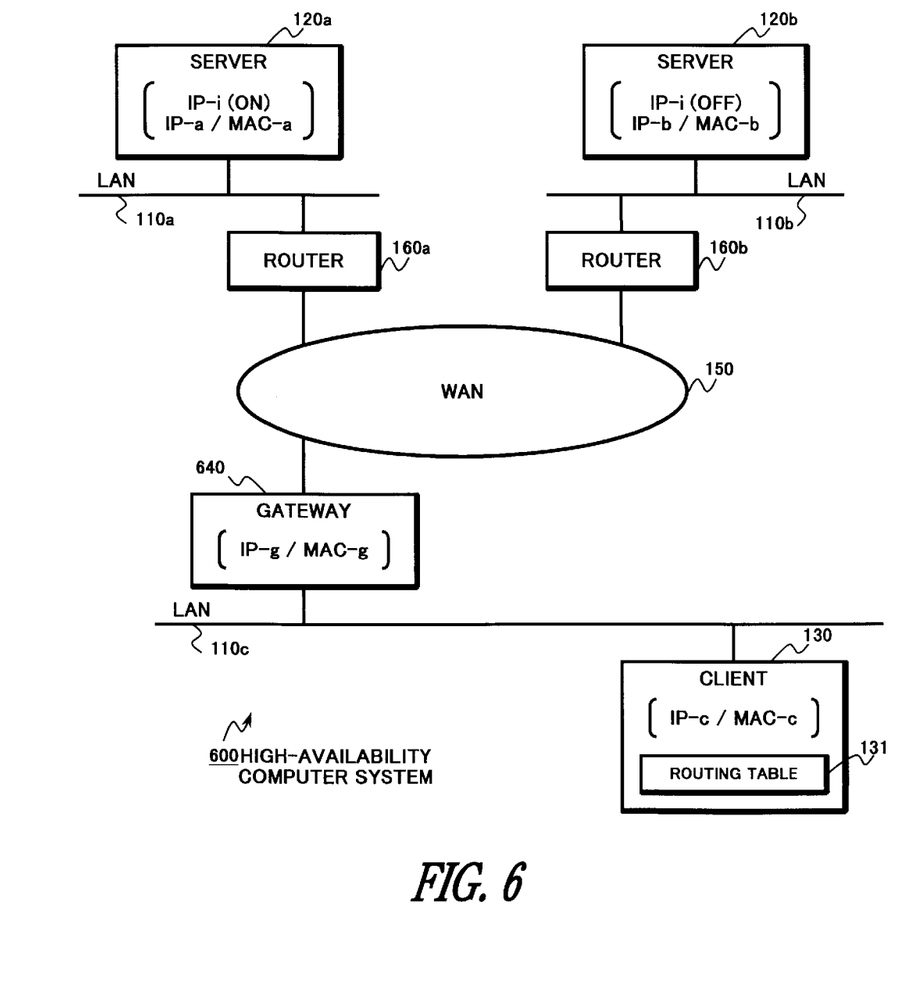
FIG. 6 is an exemplary block diagram of a high-availability computer system according to one embodiment of the present invention.

FIG. 6 is another exemplary block diagram depicting the configuration of a high-availability computer system 600 according to the present invention.

The present invention may be applied to a system in which gateway 640 also functions as a router. When a packet 200 addressed to an IP-i is transmitted from client 130, the procedures discussed above are also applied.

Figure 7:
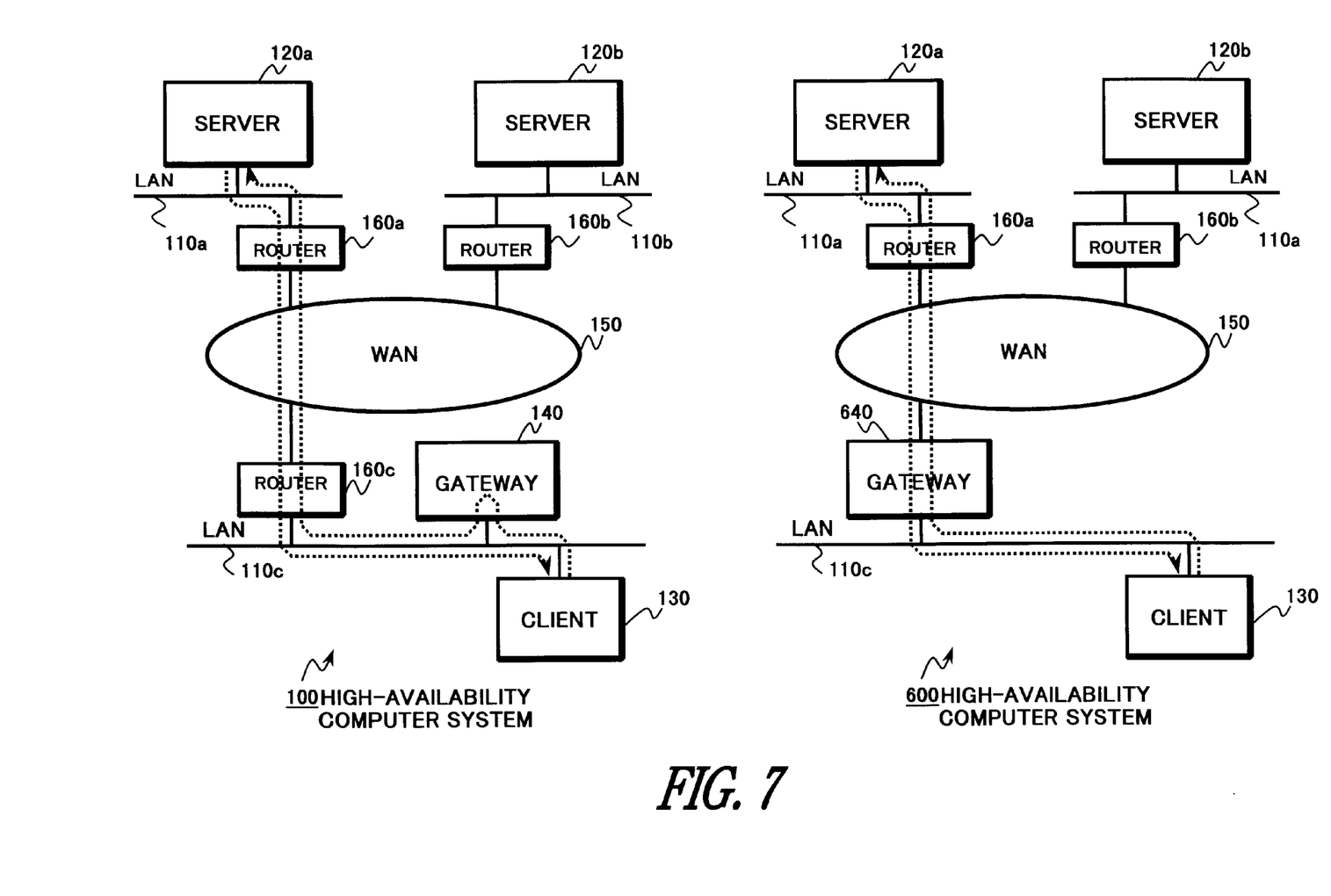
FIG. 7 is an exemplary block diagram illustrating routes through which packets are transmitted in systems shown in FIG. 1 and FIG. 6.

FIG. 7 is an exemplary block diagram depicting routes through which a packet 200 addressed to an IP-i are transmitted, in systems 100 and 600 shown in FIG. 1 and FIG. 6 respectively.

Some other modified examples will be described below.

(1) In step S3 of FIG. 5(b), IP trailer 220e may be divided into two and transmitted to transport layer 144 as data F1 and F2. In this case, in step S5 of FIG. 5(c), IP trailer 220e is restored by combining data F1 and F2. This example is fit in a case where the size of IP trailer 220e is larger than the UDP data section of UDP trailer 240h.

(2) In step S3 of FIG. 5(b), IP trailer 220e may be compressed and transmitted to transport layer 144. In this case, in step S5 of FIG. 5(c), IP trailer 220e is restored by decompressing the compressed data. This example is also fit in the case where the size of IP trailer 220e is larger than the UDP data section of UDP trailer 240h.

(3) In step S3 of FIG. 5(b), IP trailer 220e may be encoded and transmitted to transport layer 144. In this case, in step S5 of FIG. 5(c), IP trailer 220e is restored by decoding the encoded data.

The modified examples above may be combined with each other. Another modified example includes the use of TCP instead of UDP as the protocol used for transmitting a packet from gateway 140 to server 120. In this case, instead of an UDP trailer, a TCP trailer is used.

Furthermore, when receiving a packet 200 from client 130 addressed to an IP-i, gateway 140 may determine a destination server 120 by checking whether an IP address of the client is an odd number or an even number, specifically, whether a host address section of the source IP address is add or even. If a corresponding server is down, regardless of odd/even of the resource IP address, the other server is selected. Therefore, in this case flag information in the IP address correspondence table 141 may indicate whether the server is operative or down. That is, an IP-i of server 120 is set with "ON" when it is operative, and set with "OFF" when it is down. In this case, it would be easy and better that each server 120 periodically transmits to gateway 140 an ON notice when it is operative, and gateway 140 sets "OFF" the flag information of server 120 which does not transmit the notice more than a predetermined number of times. On the other hand, gateway 140 may periodically communicate with each server 120, and set an ON/OFF in flag information based on a reply from each server 120.

Figure 8:
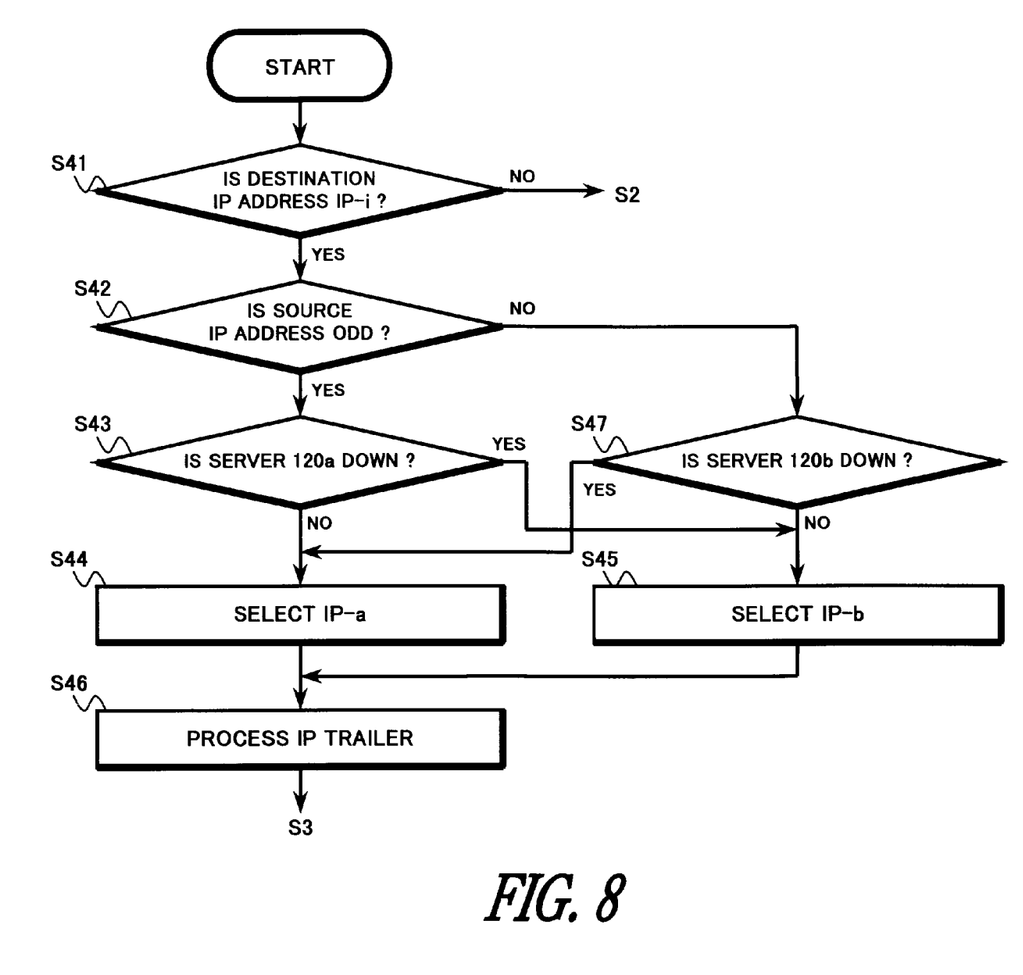
FIG. 8 is an exemplary flowchart illustrating a method for selecting a server in accordance with an embodiment of the present invention.

FIG. 8 is an exemplary flowchart depicting a procedure of the modified example above in which the client IP address is checked for an odd/even number. The flowchart includes the processing of a packet 200 as part of gateway program 146, when the packet 200 is received from client 130.

IP trailer 220 is extracted from the received packet 200, and destination IP address 231 of IP header 230 is checked for an actual IP address (step S41). If destination IP address 231 is different from an IP-i, IP trailer 220 is forwarded to internet layer 143 (step S2). Meanwhile, if destination IP address 231 is an IP-i, source IP address 232 of the IP header 230 is checked for an odd number (step S42). If the IP address is an odd number and the flag information corresponding to the IP-i is "ON" (i.e., when server 120a is operative), the IP-i is selected as a new destination IP address (steps S43 and S44). In this case, IP trailer 220 requested by client 130 is processed by server 120a. Meanwhile, even if the IP address is an odd number, the IP-b is selected when the flag information corresponding to the IP-i is "OFF" (when server 120a is down, steps S43 and 45).

On the other hand, if the IP address is an even number and the flag information, corresponding to the IP-b is "ON" (i.e., when server 120b is operative), the IP-b is selected as a new destination IP address (steps S47 and S45). In this example, IP trailer 220 requested by client 130 is processed by server 120b. Meanwhile, even if the IP address is an even number, the IP-b is selected when the flag information corresponding to the IP-i is "OFF", i.e., when server 120b is down, steps S47 and S44.

After an actual IP address is selected as a new destination IP address, IP trailer 220e of received packet is processed in the same way as described in step S23 (step S46).

Thus, although both server 120a and 120b are set with a valid imaginary IP address IP-i, IP trailer 220 transmitted by client 130 and addressed to the IP-i is processed by either server 120a or 120b based on whether an IP-c, IP address assigned to client 130, is an odd number or an even number. The present invention thus allows the takeover of IP addresses in a WAN environment where one of servers 120a or 120b provides service to a requesting client 130.

As a result, if there is a plurality of clients such as client 130, and number of clients assigned to an odd-numbered IP address is appropriately the same as the number of clients assigned to an even-numbered IP address, half of the clients are provided with service by server 120a while the rest are provided with the same service by server 120b. Consequently, the system 100 keeps a load balance.

If a number of servers is N (more than two), when destination IP address 232 of packet 200 addressed to the IP-i is N·n(i−1) (n=0, 1, 2, . . . ), an IP address of the i-th server (i=1−N) is selected to keep a load balance among N servers.

Furthermore, gateway 140 may periodically inquire each server about a load status, or each server periodically informs gateway 140 of its load balance, so that gateway 140 can obtain a load status of each server. Gateway 140 selects a server that processes a request by client 130 in consideration of the load status.

As described above, consistent with the principles of the present invention, a packet containing a network trailer addressed to an imaginary network address is transmitted to a gateway. The gateway generates a new packet containing the network trailer, addresses the new packet with an actual IP address of one of a plurality of servers according to states of the system, and then transmits the new packet to the server. The server periodically informs the gateway of a state of its own IP-i, and the gateway updates its own IP address correspondence table. Therefore, even between distant servers connected with each other via a WAN, the service to be provided to a client can be taken over in the same way as between adjacent servers.

Furthermore, consistent with the principles of the present invention, the gateway selects a network address of a destination server based on a network address of the client's own IP address or load status of each server. Therefore, the load on the servers can be dispersed.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A method for switching servers in a network computer system, the system which comprises a client, a plurality of servers which have both their several actual addresses and an imaginary address in common, and a gateway, comprising:

transmitting a first packet addressed to the imaginary address, the packet including a network trailer;

extracting the network trailer from the first packet;

generating a second packet that includes the network trailer;

assigning one of the actual addresses to the second packet;

transmitting the second packet to a server having the actual address; and extracting the network trailer from the second packet.

2. The method of claim 1, further comprising the step of:

informing the gateway of an operation state of each server; and wherein the assigning step includes selecting the actual address from one of operational servers.

3. The method of claim 1, further comprising the step of:

checking an operation state of every server; and wherein the assigning step includes selecting the actual address from one of operational servers.

4. The method of claim 1, wherein:

the assigning step includes selecting the actual address based on an address of the client.

5. The method of claim 1, further comprising the step of:

informing the gateway of a load state of each server; and wherein the assigning step includes selecting the actual address based on the load state.

6. The method of claim 1, further comprising the step of:

checking a load state of every server; and wherein the assigning step includes selecting the actual address based on the load state.

7. The method of claim 1, further comprising the steps of:

dividing the network trailer into sections each of which is within a predetermined size;

combining those sections to restore the network trailer;

wherein the generating a second packet step comprises generating a plurality of second packets which include the divided network trailers; and the extracting the network trailer from the second packet step comprises extracting the divided network trailers from the second packets.

8. The method of claim 1, further comprising the steps of:

compressing the network trailer at the gateway; and decompressing the compressed network trailer at the server.

9. The method of claim 1, further comprising the steps of:

encoding the network trailer at the gateway; and decoding the encoded network trailer at the server.

10. A network computer system, comprising:

a plurality of servers each of which has at least one corresponding actual addresses and all having an imaginary address in common;

a client which transmits a first packet addressed to an imaginary address which contains a network trailer; and a gateway which extracts the network trailer from the first packet, generates a second packet which includes the network trailer, assigns one of the actual addresses to the second packet, and transmits the second packet to a server having the actual address;

wherein the server extracts the network trailer from the second packet.

11. The system of claim 10, wherein the gateway includes a table for storing information regarding which server is currently valid for the imaginary address.

12. The system of claim 11, wherein:

each server informs the gateway of its own operation state; and the gateway updates the table and selects the actual address from one of operational servers.

13. The system of claim 11, wherein:

the gateway checks an operation state of every server, updates the table, and selects the actual address from one of operational servers.

14. The system of claim 11, wherein the gateway selects the actual address based on an address of the client.

15. The system of claim 11, wherein:

each server informs the gateway of its own load state; and the gateway updates the table and selects the actual address based on the load state.

16. The system of claim 11, wherein the gateway checks the load state of every server, updates the table, and selects the actual address based on the load state.

17. The system of claim 11, wherein:

the gateway divides the network trailer into sections each of which is within a predetermined size, and generates a plurality of second packets which contains the divided network trailers; and the server combines those sections to restore the network trailer, and extracts the divided network trailers from the second packets.

18. The system of claim 11, wherein:

the gateway compresses the network trailer; and the server decompresses the compressed network trailer.

19. The system of claim 11, wherein:

the gateway encodes the network trailer; and the server decodes the encoded network trailer.

20. A method for transmitting a packet in a network computer system comprising a plurality of computers which have both their several actual addresses and an imaginary address in common, comprising:

receiving a first packet addressed to the imaginary address, the packet including a network trailer;

extracting the network trailer from the first packet;

generating a second packet that includes the network trailer;

assigning one of the actual addresses to the second packet; and transmitting the second packet to a computer having the actual address.

21. A method for processing a packet transmitted in a network computer system comprising a plurality of computers which have both their several actual addresses and an imaginary address in common, comprising:

receiving a packet;

determining whether a received packet is addressed to an actual address or an imaginary address;

stripping the packet of every header section if the packet is addressed to the imaginary address; and processing the remainder of the packet as a network trailers.

22. A system for switching servers in a network computer system, the system which comprises a client, a plurality of servers which have both their several actual addresses and an imaginary address in common, and a gateway, comprising:

means for transmitting a first packet addressed to the imaginary address, the packet including a network trailer;

means for extracting the network trailer from the first packet;

means for generating a second packet that includes the network trailer;

means for assigning one of the actual addresses to the second packet;

means for transmitting the second packet to a server having the actual address; and means for extracting the network trailer from the second packet.

* * * * *